US006685177B2

(12) United States Patent

Dugas et al.

(10) Patent No.: US 6,685,177 B2

(45) Date of Patent: Feb. 3, 2004

(54) CLAMPING LOCATOR

(75) Inventors: Michael R. Dugas, Brighton, MI (US); Velibor Kilabarda, Birmingham, MI (US); Fred Zarna, Harrison Township, MI (US); Greg Bildson, Ortonville, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 12 days.

(21) Appl. No.: 10/044,134

(22) Filed: Jan. 10, 2002

(65) Prior Publication Data

US 2002/0093131 A1 Jul. 18, 2002

Related U.S. Application Data

(60) Provisional application No. 60/262,565, filed on Jan. 18, 2001, and provisional application No. 60/278,225, filed on Mar. 23, 2001.

(51) Int. Cl.[7] .................................................. B23Q 3/08

(52) U.S. Cl. ......................... 269/32; 269/229; 269/232; 269/233; 269/234; 269/238; 269/329; 269/217

(58) Field of Search ......................... 269/32, 232, 233, 269/229, 217, 234, 329, 238

(56) References Cited

U.S. PATENT DOCUMENTS 2,140,658 A * 12/1938 Van Sittert .................. 269/234
2,188,450 A 1/1940 Verdon-Roe
2,377,086 A 5/1945 Lang
3,233,908 A 2/1966 Schwarzmayr et al.
3,414,253 A 12/1968 Mewse
4,564,151 A 1/1986 Pali
5,996,984 A * 12/1999 Takahashi .................... 269/32
6,102,383 A 8/2000 Tunkers
6,364,300 B1 4/2002 Kita

FOREIGN PATENT DOCUMENTS

EP 1 055 474 11/2000
FR 2 733 930 11/1996

* cited by examiner

*Primary Examiner*—Robert C. Watson

(74) *Attorney, Agent, or Firm*—Young & Basile, P.C.

(57) ABSTRACT

A clamping and locating fixture includes a hollow body, a pin or angled plate mountable to the body, a locking arm positionable within the body locatable between two positions and a drive pin moveable within the body to engage the locking arm. A workpiece can be directed to a clamping position by the guide pin or angled plate. The pin or plate includes an aperture allowing a locking projection of the locking arm to extend therethrough and over a workpiece to clamp the workpiece for a processing operation. The locking projection can be retracted through the aperture while the workpiece is being located or is being removed. The drive pin can be moved within the body to engage a cam follower of the locking arm.

40 Claims, 4 Drawing Sheets

CLAMPING LOCATOR

CROSS-REFERENCE TO RELATED APPLICATIONS

This application claims the benefit of the provisional patent application 60/262,565 for a LOCKING AND LOCATING PIN, filed on Jan. 18, 2001, and also claims the benefit of the provisional patent application 60/278,225 for a CLAMPING LOCATOR, filed on Mar. 23, 2001. This claim is made under 35 U.S.C. §119(e) and 37 C.F.R. §1.53(c)(3).

FIELD OF THE INVENTION

The invention relates to an apparatus for engaging a workpiece, and more specifically, the invention provides a clamping locator for retaining an automotive body component.

BACKGROUND OF THE INVENTION

It has been a problem that current configurations of fixturing devices for automotive body components are not as flexible as desired. These current configurations are inoperable to both locate and lock an automotive body component simultaneously with a relatively compact, inexpensive, reliable clamping and locating device. Typically, a fixturing device will have at least one locating guide and at least one clamping or fixturing device.

SUMMARY OF THE INVENTION

The present invention provides an apparatus for clamping and locating a workpiece. The apparatus includes a body having a length and an aperture extending along at least a portion of the length of the body. The invention can also include a guide or guide pin fixedly attached to the body. The guide or wedge has an angled end for engaging a surface on a workpiece. The guide pin has a tapered end for engaging a surface on a workpiece and an open end. The guide, or guide pin, also includes an opening or port extending from a side of the guide, or guide pin, in communication with the aperture of the body. The tapered end of the guide pin allows a workpiece to be precisely positioned over the guide pin in two dimensions. The guide or wedge includes an angled surface for precisely locating a workpiece in a single dimension. The apparatus also includes a locking arm. The locking arm is mounted within the body and is rotatable between an extended clamping position and a retracted disengaged position. The locking arm includes a cam follower and a locking projection. The locking projection extends through the aperture and the open end of the guide, or guide pin. The locking projection is operable to extend through the port of the guide, or guide pin, and is operable to be retracted from the port in response to the locking arm movement between the extended position and the retracted position respectively. When the locking arm is in a locking position, the locking projection extends through the port to clamp a located workpiece. The apparatus also includes a drive pin. The drive pin has a cam surface extending along at least one side of the pin. The pin projects through the aperture of the body. The cam surface operably engages the cam follower of the locking arm to rotate the locking arm between the extended or locked position and the retracted or unlocked position. The apparatus can also include an actuator for extending and retracting the drive pin.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
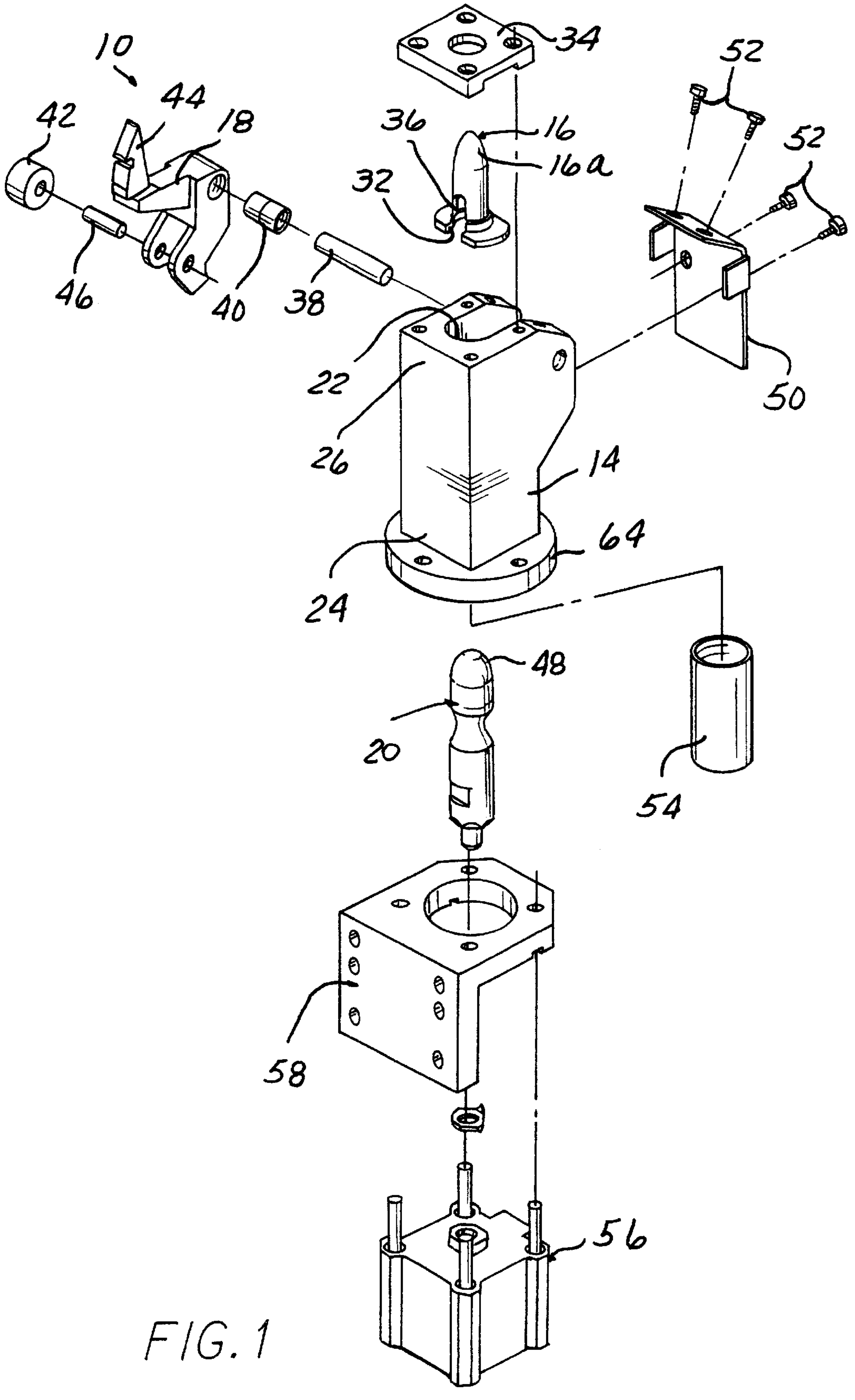
FIG. 1 is an exploded view of a clamping locator with a locating pin according to the present invention.

The present invention provides a clamping locator 10 for clamping a workpiece. The clamping locator 10 includes a body 14, guide means 16, a locking arm 18 and a drive pin 20. The guide means 16 can be a locating pin **16*a* or a locating guide 16*b*. The guide means 16 can receive a workpiece 12 and guide the workpiece 12 into a precise position. The workpiece 12 can then be locked in position between the body 14 and the locking arm 18 in response to movement of the drive pin 20. When the workpiece 12 has been locked into position, a processing operation can be performed on the workpiece 12**.

Figure 2:
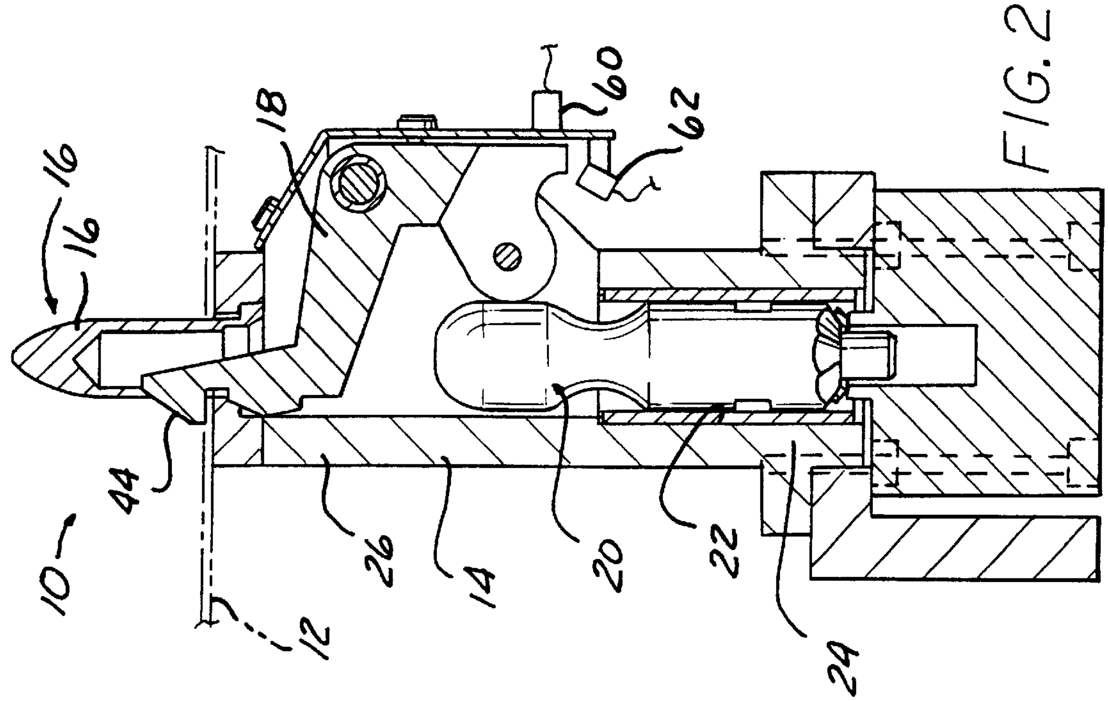
FIG. 2 is a cut away view of the clamping locator of FIG. 1 in a locked position.

The body 14 acts as a base and support for the guide means 16. The body 14 has an aperture 22 extending through at least a portion of the length of the body 14. As shown in FIG. 2, the aperture 22 can have a circular cross section at a first end 24 of the body 14 and a non-circular cross section at a second end 26 of the body 14. The aperture 22 is sized to receive the locking arm 18.

Figure 3:
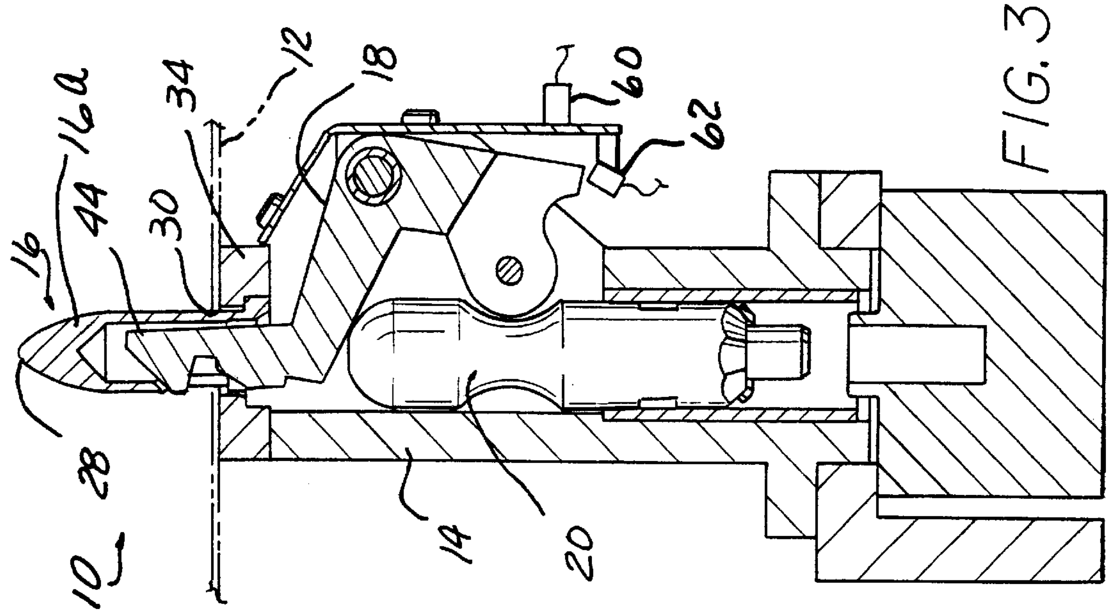
FIG. 3 is a cut away view of the clamping locator of FIG. 1 in an open position.
Figure 6:
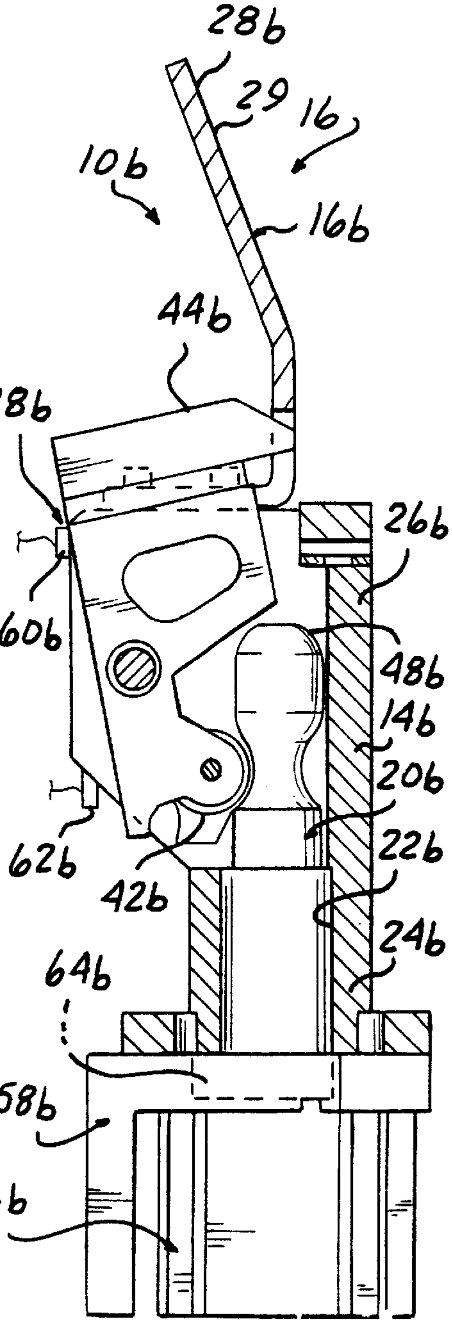
FIG. 6 is a cut away view of the clamping locator of FIG. 4 in an open position.

The guide means 16 can be a locating pin **16*a*, or a locating guide 16*b*. As shown in FIG. 3, the guide pin 16*a* includes a tapered end 28. The tapered end 28 is operable to receive a workpiece 12 having a locating aperture or surface 30. The guide pin 16*a* has a diameter or shape corresponding to the diameter or shape of the aperture or surface 30 to precisely locate the workpiece in at least two dimensions. The guide pin 16*a* also includes an open end 32, as shown in FIG. 1. The open end 32 is positioned communicating with the aperture 22 through the body 14. The guide pin 16*a* is immovably associated with the body 14. The guide pin 16*a* can be formed integral with the body 14, can be affixed by welding or soldering, or can be attached to the body 14 with a bracket or replaceable wear pad 34 and suitable fasteners. The guide pin 16*a* also includes a port 36. The port 36 extends from a side of the guide pin 16*a* and extends through to the open end 32. The port 36 is formed of appropriate size and shape to allow a locking projection 44 of the locking arm 18 to extend through the port 36. As shown in FIG. 6, the guide means 16 can include a locating guide or wedge 16*b* having an angled end 28*b*. The tapered or angled end 28*b* is operable to receive a workpiece 12*b* having a locating surface 30*b*. In operation, the surface 30*b* engages a surface 29 of the angled end 28*b***. The workpiece

Figure 4:
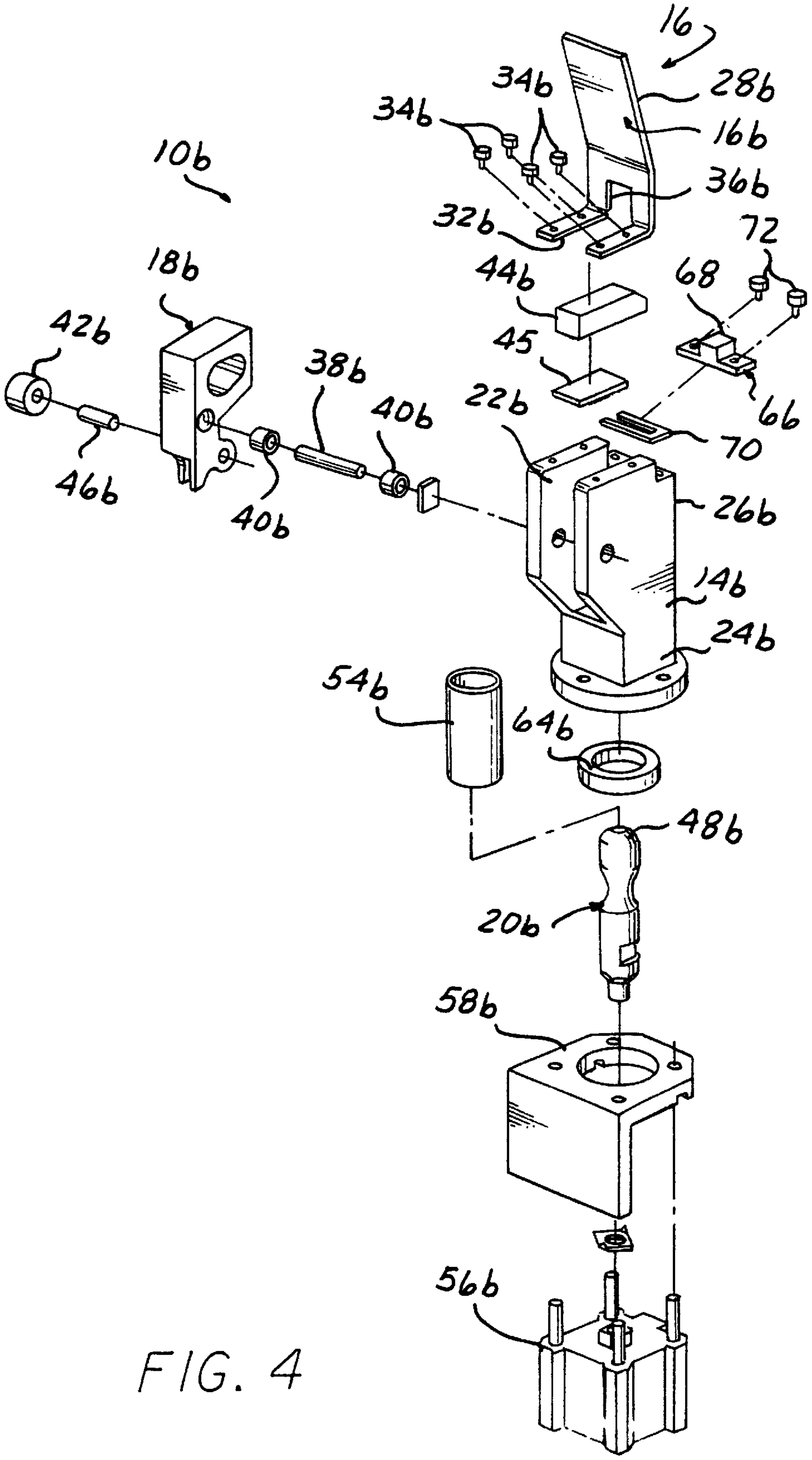
FIG. 4 is an exploded view of a clamping locator with a locating guide or wedge according to the present invention.

12*b* is urged toward the body 14*b*. The surface 30*b* follows the surface 29 as the workpiece 12*b* is urged downward toward the body 14*b* to precisely locate the workpiece in at least a single dimension. The guide 16*b* also includes an open end 32*b*, as shown in FIG. 4. The open end 32*b* is positioned communicating with an aperture 22*b* through the body 14*b*. The body 14*b* has the aperture 22*b* extending through the length of the body 14*b*. As shown in FIG. 4, the aperture 22*b* can have a circular cross section at a first end 24*b* of the body 14*b* and a non-circular cross section at a second end 26*b* of the body 14*b*. The aperture 22*b* is sized to receive the locking arm 18*b*. The guide or wedge 16*b* is immovably associated with the body 14*b*. The guide 16*b* can be formed integral with the body 14*b*, can be affixed by welding or soldering, or can be attached to the body 14*b* with suitable fasteners 34*b*. The guide 16*b* also includes a port 36*b*. The port 36*b* extends through a side of the guide 16*b* and extends to the open end 32*b*. The port 36*b* is formed of an appropriate size and shape to allow a locking projection 44*b* of the locking arm 18*b* to extend through the port 36*b*.

The clamping locator 10 also includes the locking arm 18. As shown in FIGS. 1–3, the locking arm 18 is mounted in the body 14. As shown in FIG. 1, the locking arm 18 can be mounted on a pin or shaft 38. The locking arm can also be mounted on a bearing 40 mounted on the pin or shaft 38. The locking arm 18 is rotatable relative to the body 14. The locking arm 18 includes a cam follower 42 and a locking or clamping projection 44. The cam follower 42 is positioned within the aperture 22 of the body 14. The cam follower 42 can be integral with the locking arm 18 or can be mounted on the locking arm 18 with a pin or shaft 46. The locking projection 44 of the locking arm 18 extends through the aperture 22, through the open end 32 of the guide 16, and is operable to project through the port 36. The locking projection 44 can be integral with the locking arm 18 or can be a separate component mounted to the locking arm 18. When the clamping locator 10 of the present invention is in a locked position, the locking projection 44 extends through the port 36 to clamp a workpiece in position. As shown in FIG. 2, the locking projection 44 can clamp a workpiece 12 between the locking projection 44 and the body 14. When the clamping locator 10 of the present invention is in an unlocked position, the locking projection 44 is retracted internally relative to the pin 16. As shown in FIG. 3, the locking projection 44 can be retracted internally relative to the guide means 16.

Figure 5:
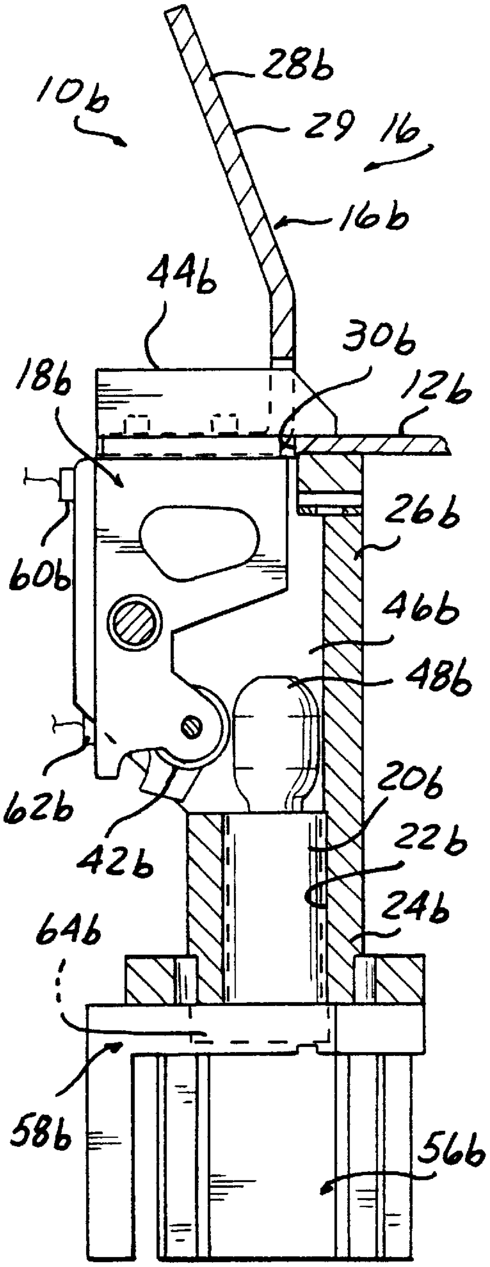
FIG. 5 is a cut away view of the clamping locator of FIG. 4 in a locked position.

As shown in FIGS. 4–6, the locking arm 18*b* can be mounted on a pin or shaft 38*b*. The locking arm can also be mounted on a bearing 40*b* mounted on the pin or shaft 38*b*. The locking arm 18*b* is rotatable relative to the body 14*b*. The locking arm 18*b* includes a cam follower 42*b* and a locking projection 44*b*. The cam follower 42*b* is positioned within the aperture 22*b* of the body 14*b*. The cam follower 42*b* can be integral with the locking arm 18*b* or can be mounted on the locking arm 18*b* with a pin or shaft 46*b*. The locking projection 44*b* of the locking arm 18*b* extends through the aperture 22*b*, through the open end 32*b* of the guide 16*b*, and is operable to project through the port 36*b* to clamp the workpiece between the projection 44*b* and the body 14*b*. When the clamping locator 10*b* of the present invention is in a locked position, the locking projection 44*b* extends through the port 36*b*. When the clamping locator 10*b* of the present invention is in an unlocked position, the locking projection 44*b* is retracted to an opposite side of the guide 16 relative to the surface 29 of the guide or wedge 16*b*. As shown in FIG. 5, the locking projection 44*b* can clamp a workpiece 12*b* between the projection 44*b* and the replaceable wear pad 66. As shown in FIG. 6, the locking projection 44*b* can be retracted out of the port 36*b*. The locking projection 44*b* can be integral with the locking arm 18*b* or can be a separate component mounted to the locking arm 18*b*. The locking arm 18*b* can include a gauge or spacer block 45 to mount the locking projection 44*b*. A plurality of differently sized blocks 45 can accommodate a plurality of different gauge metal sheet workpieces 12. In other words, the spacer block 45 can be changed to accommodate different thicknesses of workpieces to be clamped in the clamping locator 10 according to the present invention.

The clamping locator 10 also includes a drive pin 20. The drive pin 20 is extendable in the aperture 22 of the body 14 between a first position and a second position. The drive pin 20 extends in the aperture 22 from the first end 24 toward the second end 26. The drive pin 20 includes a cam surface 48 for engaging the cam follower 42. The drive pin 20 is extendable between at least two positions in the aperture 22. FIG. 2 shows the drive pin 20 in a generally retracted position within the aperture 22. FIG. 3 shows the drive pin 20 in a generally extended position within the aperture 22.

The body 14 can be operable to receive an individual locking arm 18 chosen from a plurality of differently configured locking arms. The aperture 22 can be opened by removing a cover 50. When the cover 50 is removed, the pin or shaft 38 can be removed and the locking arm 18 can also be removed. A second locking arm can be inserted into the body 14. The cover 50 can be mounted to the body 14 with fasteners 52. The body 14 can also include a sleeve 54. The sleeve 54 can be desirable to reduce friction between the extendable drive pin 20 and the body 14. The body 14 can also include a first sensor 60 and a second sensor 62 for sensing a position of the locking arm 18. As shown in FIG. 2, a first sensor 60 can sense the locking arm 18 in the extended, clamped position. As shown in FIG. 3, a second sensor 62 can sense the locking arm 18 in the retracted or released position.

The clamping locator 10 of the present invention can also include an actuator 56. The actuator 56 can be operably associated with the drive pin 20 to extend and retract the drive pin 20. The actuator 56 can be a fluid operated actuator such as a hydraulic or pneumatic cylinder, or an electric actuator such as a roller screw drive or a standard screw drive. The body 14 can be mounted to the actuator 56 with a bracket 58 and base 64 or a locking ring 64*b*. The bracket 58 can also be operable to mount the clamping locator 10 to another component of a work station.

The clamping locator 10*b* of the present invention can also include a mounting block or replaceable wear pad 66. The wear pad 66 is replaceably mounted with respect to the body 14*b*. The workpiece 12*b* is clamped between a wear surface 68 of the wear pad 66 and the replaceable locking projection 44*b*. The wear pad 66 can be mounted to the body 14*b* with fasteners 72. A spacer element 70 can be positioned between the wear pad 66 and the body 14*b* to adjust the precise locating position of the wear pad 66 relative to the locking projection 44*b* when the clamping locator 10*b* is in an extended, clamped position as show in FIG. 5.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for locating and clamping a workpiece comprising:

a body having an aperture extending at least partially therethrough;

a pin having a cam surface and movable within the aperture of the body between at least first and second end limits of movement relative to the body, the first end limit corresponding to a retracted position and the second end limit corresponding to a clamped position;

a locking arm having a locking projection and a cam follower, the locking arm supported by the body at least partially within the aperture of the body for pivoting movement, the cam follower engagable with the cam surface of the pin, the locking arm rotatable between at least a first position corresponding to the retracted position and a second position corresponding to the clamped position; and means for guiding a workpiece to a clamping position, the guiding means having a guiding surface engagable with a surface of the workpiece, the guiding means having a port allowing the locking projection to extend through the port when the locking arm is in the second position, such that the workpiece can be clamped between the locking projection and the body, and the port allowing retraction of the locking projection through the port to a position completely within the guide means when the locking arm is in the first position.

2. The apparatus of claim 1, wherein the guiding means further comprises a locating pin insertable in an aperture of the workpiece.

3. The apparatus of claim 1, wherein the guiding means further comprises a locating guide having a tapered surface formed of two planar surfaces disposed at an angle with respect to one another and engagable with an edge of the workpiece.

4. The clamping locator of claim 1, wherein the guide means further comprises:

a guide mounted with respect to the drive pin and the clamp to be engagable with the workpiece for guiding the workpiece to a predetermined location prior to movement of the clamp from the retracted position to the clamped position.

5. The clamping locator of claim 4, wherein the guide further comprises a locating pin.

6. The clamping locator of claim 5, wherein the locating pin defines an aperture enclosing the clamp when in the retracted position.

7. The clamping locator of claim 4, wherein the guide further comprises an angled plate.

8. The clamping locator of claim 7, wherein the angled plate defines an aperture such that the clamp is engagable with the workpiece through the aperture of the angled plate.

9. The apparatus of claim 1, wherein the locating means further comprises:

a pin having a tapered end for engaging an aperture in the workpiece to locate the workpiece at the clamped position.

10. A clamping locator for holding a workpiece comprising:

an elongate drive pin moveable between first and second end limits of travel, the pin having a cam surface formed along a longitudinal length thereof;

a clamp having a cam follower operably engagable with the cam surface of the drive pin for driving the clamp between a clamped position and a released position in response to movement of the drive pin between the first and second end limits of travel; and a guide mounted with respect to the drive pin and the clamp to be engagable with the workpiece for guiding the workpiece to a predetermined location prior to movement of the clamp from the released position to the clamped position, wherein the guide includes an angled plate.

11. The clamping locator of claim 10 further comprising at least one sensor for signaling if the clamp is in one of the clamped position and released position.

12. The clamping locator of claim 10 further comprising an actuator connected to the drive pin for driving the pin in movement between the first and second end limits of travel.

13. The clamping locator of claim 10, wherein the angled plate defines an aperture such that the clamp is engagable with the workpiece through the aperture of the angled plate.

14. An apparatus for engaging a workpiece comprising:

means for locating the workpiece with respect to a clamping position, the locating means having a locating surface and an aperture disposed through the locating surface, wherein the locating means includes a bracket having an angled projection, the angled projection extending away from the clamping position, the workpiece engagable with the angled projection to locate the workpiece in the clamping position; and means for clamping the workpiece at the clamping position, the clamping means supported by the locating means to clamp the workpiece and retractable within the aperture while the workpiece is being located at the clamping position and removed from the clamping position.

15. The apparatus of claim 14, wherein the clamping means further comprises:

a locking arm having a locking projection, the locking arm rotatable between an engaged position and an opened position, the locking projection extending through the aperture of locating means when the locking arm is in the engaged position and retracted within the aperture when the locking arm is in the opened position.

16. The apparatus of claim 14 further comprising:

a body having an aperture extending through at least a portion of the body, the locating means mountable on the body and the clamping means mountable in the aperture of the body.

17. The apparatus of claim 14 further comprising:

at least one sensor for sensing whether the clamping means is in one of the engaged position and opened position.

18. The apparatus of claim 14 further comprising:

a linear actuator engagable with the clamping means to move the clamping means with respect to the aperture of the locating means between an engaged position of the clamping means and an opened position of the clamping means.

19. An apparatus for engaging a workpiece comprising:

means for locating the workpiece with respect to a clamping position, the locating means having a locating surface and an aperture extending through the surface, wherein the locating means includes a bracket having an angled projection, the angled projection extending away from the clamping position, the workpiece engagable with the angled projection to locate the workpiece in the clamping position;

means for clamping the workpiece at the clamping position, the clamping means extendable through the aperture of locating means to clamp the workpiece and retractable within the aperture while the workpiece is being located at the clamping position and removed from the clamping position; and a body having an aperture extending through at least a portion of the body, the locating means mountable on the body and the clamping means supported by the body.

20. An apparatus for engaging a workpiece comprising:

means for locating the workpiece with respect to a clamping position, the locating means having a locating surface and an aperture extending through the surface, wherein the clamping means includes a locking arm having a locking projection and a cam follower, the locking arm rotatable between at least two positions relative to the body corresponding to an engaged position and an opened position, the locking projection extendable through the aperture of locating means when the locking arm is in the engaged position and retracted within the aperture when the locking arm is in the opened position, and a drive pin having a cam surface moveable within the aperture of the body to engage the cam follower of the locking arm, the drive pin movable between at least two positions relative to the body corresponding to the engaged position and the opened position;

means for clamping the workpiece at the clamping position, the clamping means extendable through the aperture of locating means to clamp the workpiece and retractable within the aperture while the workpiece is being located at the clamping position and removed from the clamping position; and a body having an aperture extending through at least a portion of the body, the locating means mountable on the body and the clamping means supported by the body.

21. The apparatus of claim 20, wherein the locating means further comprises:

the locating surface defined by a pin having a tapered end for engaging an aperture in the workpiece to locate the workpiece in the clamping position.

22. The apparatus of claim 20 further comprising:

a linear actuator engagable with the drive pin to move the drive pin within the aperture of the body between a first position defining an opened position of the locking arm, and a second position defining the engaged position of the locking arm.

23. The apparatus of claim 20 further comprising:

at least one sensor for sensing whether the locking arm is in one of the engaged position and the opened position.

24. The apparatus of claim 20 further comprising:

a removable cover mounted on the body, the cover allowing access to the locking arm.

25. An apparatus for engaging a workpiece comprising:

means for locating the workpiece in a clamping position, the locating means having a locating surface and an aperture extending through the surface, wherein the locating means includes a bracket having an angled projection, the angled projection extending away from the clamping position, the workpiece engagable with the angled projection to locate the workpiece in the clamping position;

a body having an aperture extending at least partially therethrough, the locating means mountable on the body and the clamping means mountable in the aperture of the body, a locking arm having a locking projection and a cam follower, the locking arm rotatable between two positions relative to the body corresponding to an engaged position and an opened position, the locking projection extending through the aperture of the locating means when the locking arm is in the engaged position and retracted within the aperture when the locking arm is in the opened position; and a drive pin having a cam surface moveable within the aperture of the body to engage the cam follower of the locking arm, the drive pin movable between two positions relative to the body corresponding to the engaged position and the opened position.

26. The apparatus of claim 25 further comprising:

a linear actuator engagable with the drive pin to move the drive pin within the aperture of the body between the opened position and the engaged position.

27. The apparatus of claim 25 further comprising:

at least one sensor for sensing whether the locking arm is in one of the engaged position and opened position.

28. An apparatus for locating and clamping a workpiece comprising:

means for guiding a workpiece to a clamping position relative to a body, the guide means having an aperture extending therethrough; and reciprocal cam surface means for extending a locking projection through the aperture in the guiding means to clamp the workpiece between the locking projection and the body, wherein the reciprocal cam surface means includes a cam surface moveable with respect to the guide means between at least two positions corresponding to an engaged position and an opened position, and the locking projection having a cam follower, the locking projection rotatable between at least two positions relative to the guide means corresponding to the engaged position and the opened position, the locking projection extendable through the aperture in the guide means when the locking projection is in the engaged position and retracted within the aperture when the locking projection is in the opened position, wherein the cam surface of the drive pin is moveable with respect to the guide means to engage the cam follower of the locking projection for driving the locking projection between the engaged position and the opened position.

29. The apparatus of claim 28, wherein the guide means further comprises:

a pin having a tapered end for engaging an aperture in the workpiece to locate the workpiece at the clamping position.

30. In a clamping locator for holding a workpiece, the clamping locator including an elongate drive pin moveable between first and second end limits of travel, the improvement comprising:

the elongate drive pin having a cam surface formed along a longitudinal length of the pin with a constant diameter cylindrical surface portion adjacent an outer end of the pin and a reduced diameter tapered surface portion spaced longitudinally inwardly from the constant diameter cylindrical surface portion adjacent the outer end of pin; and a clamp having a cam follower operably engagable with the cam surface of the drive pin for driving the clamp between a clamped position and a released position in response to movement of the drive pin between the first and second end limits of travel, the clamp pivotable about an axis offset and perpendicular with respect to a reciprocal axis of the pin, such that the clamp is in a released position when the pin is in the first end limit of travel, while the cam follower engages the reduced diameter tapered surface portion of the pin, and the clamp is in a clamped position when the pin is in the second end limit of travel, while the cam follower engages the constant diameter cylindrical surface portion adjacent the outer end of the pin.

31. The clamping locator of claim 30 further comprising a locating guide having a tapered surface formed of two planar surfaces disposed at an angle with respect to one another and engagable with an edge of the workpiece.

32. The clamping locator of claim 30 further comprising:

a guide mounted with respect to the drive pin and the clamp to be engagable with the workpiece for guiding the workpiece to a predetermined location prior to movement of the clamp from the released position to the clamped position.

33. The clamping locator of claim 32, wherein the guide further comprises a locating pin.

34. The clamping locator of claim 33, wherein the locating pin defines an aperture enclosing the clamp when in the released position.

35. The clamping locator of claim 32, wherein the guide further comprises an angled plate.

36. The clamping locator of claim 35, wherein the angled plate defines an aperture, such that the clamp is engagable with the workpiece through the aperture of the angled plate.

37. The clamping locator of claim 30 further comprising at least one sensor for signaling if the clamp is in one of the clamped position and released position.

38. The clamping locator of claim 30 further comprising an actuator connected to the drive pin for driving the pin in movement between the first and second end limits of travel.

39. The clamping locator of claim 30 further comprising:

a bracket having an angled projection, the angled projection extending away from the clamping position, the workpiece engagable with the angled projection to locate the workpiece in the clamping position.

40. The clamping locator of claim 30 further comprising:

a body having an aperture extending through at least a portion of the body, the clamp pivotally mounted on the body and the pin reciprocally mountable within the body; and a removable cover mounted on the body, the cover allowing access to the clamp.

* * * * *